United States Patent
McFarlane et al.

(10) Patent No.: US 10,345,885 B2
(45) Date of Patent: Jul. 9, 2019

(54) POWER CONTROL OF A MEMORY DEVICE THROUGH A SIDEBAND CHANNEL OF A MEMORY BUS

(71) Applicant: INTEL CORPORATION, Santa Clara, CA (US)

(72) Inventors: Brian R. McFarlane, Hillsboro, OR (US); Robert J. Royer, Portland, OR (US); Anoop Mukker, Folsom, CA (US); Eng Hun Ooi, Georgetown (MY); Ritesh B. Trivedi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 15/277,936

(22) Filed: Sep. 27, 2016

(65) Prior Publication Data
US 2018/0088658 A1   Mar. 29, 2018

(51) Int. Cl.
*G06F 1/324*   (2019.01)
*G06F 13/00*   (2006.01)
(Continued)

(52) U.S. Cl.
CPC .......... *G06F 1/3275* (2013.01); *G06F 1/324* (2013.01); *G06F 1/3225* (2013.01);
(Continued)

(58) Field of Classification Search
CPC .... G06F 1/3275; G06F 1/3287; G06F 1/3203; G06F 1/3225; G06F 1/324; G06F 1/3278;
(Continued)

(56) References Cited

U.S. PATENT DOCUMENTS

| | | | | |
|---|---|---|---|---|
| 5,659,762 A | * | 8/1997 | Sawada | G06F 1/1616 713/323 |
| 5,983,354 A | * | 11/1999 | Poisner | G06F 13/1605 713/320 |

(Continued)

OTHER PUBLICATIONS

International Search Report and Written Opinion for PCT Patent Application No. PCT/US2017/042867, dated Nov. 2, 2017, 11 pages.

*Primary Examiner* — Jaweed A Abbaszadeh
*Assistant Examiner* — Brian J Corcoran
(74) *Attorney, Agent, or Firm* — Compass IP Law PC

(57) ABSTRACT

A method is described that includes choosing between one of two different ways to cause a memory device to enter a specific one of multiple lower power states that each comprise lower power consumption than a highest low power state. The method also includes asserting a first signal on a first signal line that is coupled to a power management controller of the memory device to indicate to the power management controller that a sideband channel of a memory bus that is coupled to the memory device is activated. The method also includes causing the memory device to enter the specific one of the multiple lower power states by also performing the chosen one of a) sending an in-band signal on said memory bus coupled with said asserting of said first signal, said in-band signal specifying the specific one of the multiple lower power states; or, b) sending a second signal on a second signal line that identifies the specific one of the multiple lower power states.

23 Claims, 6 Drawing Sheets

(51) Int. Cl.
  *G06F 1/3234* (2019.01)
  *G06F 1/3296* (2019.01)
  *G06F 1/3225* (2019.01)

(52) U.S. Cl.
  CPC ............ *G06F 1/3296* (2013.01); *G06F 13/00* (2013.01); *Y02D 10/126* (2018.01); *Y02D 10/14* (2018.01); *Y02D 10/172* (2018.01)

(58) Field of Classification Search
  CPC ........... G06F 2213/0038; G06F 3/0625; G06F 3/0688; Y02D 10/13; Y02D 50/20; Y02D 10/171; G11C 5/148; G11C 2207/2227; G11C 2211/4067; G11C 11/4072; G11C 5/14
  See application file for complete search history.

(56) References Cited

U.S. PATENT DOCUMENTS

| | | | |
|---|---|---|---|
| 6,618,791 B1* | 9/2003 | Dodd | G06F 1/3225 711/105 |
| 6,854,045 B2 | 2/2005 | Ooi et al. | |
| 7,152,125 B2 | 12/2006 | Garney et al. | |
| 7,230,627 B2 | 6/2007 | Freker et al. | |
| 7,328,304 B2 | 2/2008 | Royer, Jr. et al. | |
| 7,565,457 B2 | 7/2009 | Ooi et al. | |
| 7,587,717 B2 | 9/2009 | Garney et al. | |
| 7,612,780 B2 | 11/2009 | Freker et al. | |
| 8,051,314 B2 | 11/2011 | Huffman et al. | |
| 8,171,205 B2 | 5/2012 | Royer et al. | |
| 8,464,084 B2 | 6/2013 | Huffman et al. | |
| 8,612,666 B2 | 12/2013 | Royer, Jr. et al. | |
| 9,116,694 B2 | 8/2015 | Ooi | |
| 9,202,577 B2 | 12/2015 | Mangold et al. | |
| 2011/0264934 A1* | 10/2011 | Branover | G06F 1/3203 713/320 |
| 2013/0083611 A1 | 4/2013 | Ware et al. | |
| 2013/0305074 A1* | 11/2013 | Ellis | G11C 7/02 713/324 |
| 2014/0003145 A1 | 1/2014 | Akers et al. | |
| 2014/0089704 A1* | 3/2014 | de Santiago Domnguez | G06F 1/3284 713/323 |
| 2014/0201553 A1* | 7/2014 | Dressler | G11C 5/063 713/324 |
| 2015/0026493 A1 | 1/2015 | Kim et al. | |
| 2015/0103610 A1 | 4/2015 | Ellis et al. | |
| 2016/0210072 A1 | 7/2016 | Aizawa | |

* cited by examiner

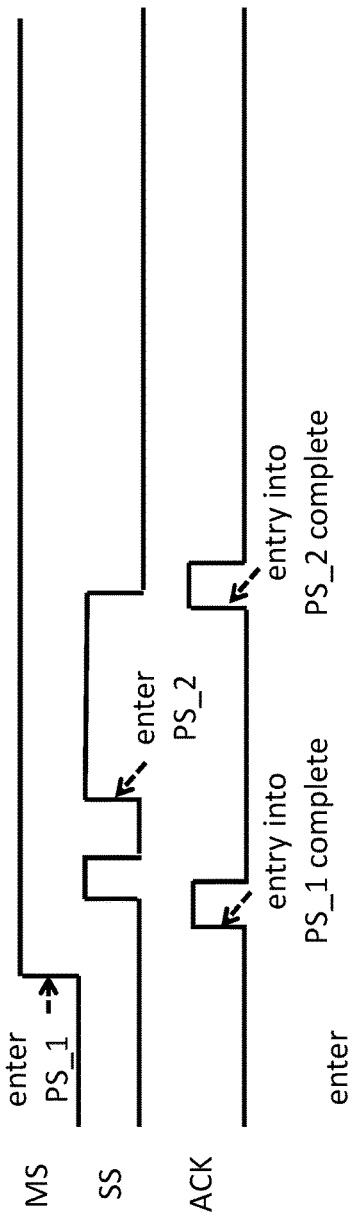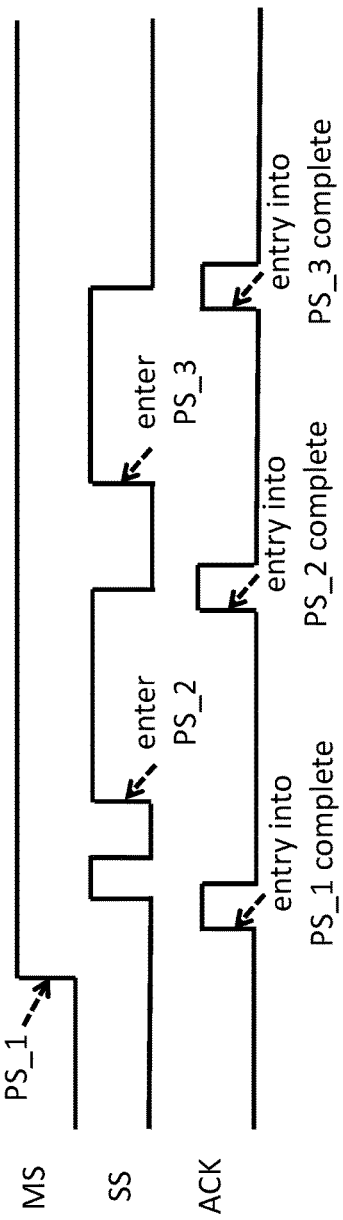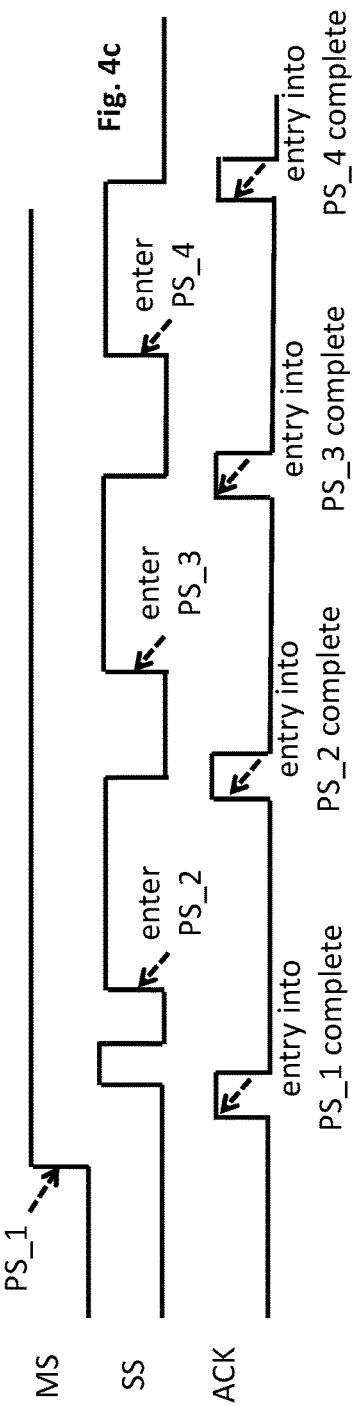

POWER CONTROL OF A MEMORY DEVICE THROUGH A SIDEBAND CHANNEL OF A MEMORY BUS

FIELD OF INVENTION

The field of invention pertains generally to computing system memory technology, and, more specifically to power control of a memory device through a sideband channel of a memory bus.

BACKGROUND

The power consumption of the various components within a computing system has become an area of heightened innovation not only for green energy reasons but also for enhanced efficiency of battery powered devices. In particular, system memory is a traditionally power hungry component of a computing system. As such, system designers are desiring more sophisticated ways of controlling the power consumption of the system memory and/or its various components.

FIGURES

A better understanding of the present invention can be obtained from the following detailed description in conjunction with the following drawings, in which:

FIGS. 4a, 4b and 4c show exemplary signaling over a sideband channel of a memory bus;

DETAILED DESCRIPTION

Figure 1:
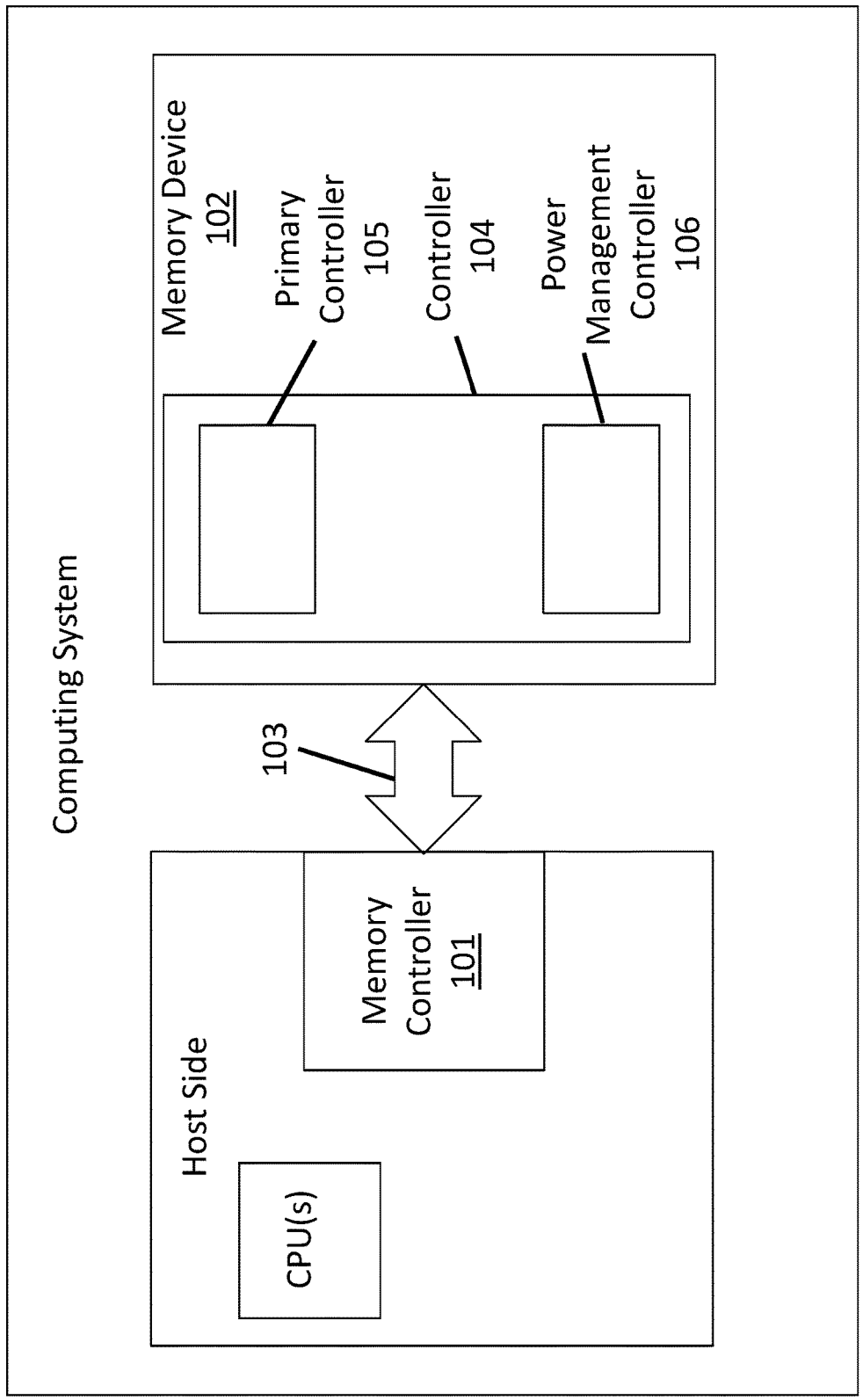
FIG. 1 shows a prior art memory controller, memory bus and memory device.

FIG. 1 shows a host-side memory controller 101 that is coupled to a memory device 102 through a memory bus 103. As observed in FIG. 1, the memory device 102 includes a controller 104 that itself is composed of a primary controller 105 and a power management controller 106.

The primary controller 105 is responsible for controlling the nominal operations of the memory device 102. For example, the primary controller 105 may include logic circuitry that oversees the memory device's column and row address decoder circuits and is invoked whenever the memory device 102 is asked to respond to a data read or data write request issued by the memory controller 101. The primary controller 105 may also oversee correct operation of other modes of operation of the memory device 102 such as responding to requests issued by the memory controller 101 that target control register space of the memory device 102.

The power management controller 106, by contrast, is responsible for managing the power consumption of the memory device 102. Here, the memory device 102 is understood to support a hierarchy of performance states and a hierarchy of power states where each next lower performance state in the hierarchy corresponds to reduced functionality and power consumption of the memory device and each next lower power state in the hierarchy corresponds to a deeper sleep state of the memory device 102 that takes longer for the memory device to awake out of.

For example, a highest performance state of the memory device 102 may correspond to the highest clock speed that the memory device 102 can operate with and the highest supply voltage that can be applied to the memory device's internal circuits. The application of the highest clock speed and highest supply voltage, in turn, causes the memory device 102 to operate at its highest performance level (smallest access times) and consume a maximum amount of power.

A next lower performance state, by contrast, may have either or both of the clock speed and supply voltage lowered to reduce both the memory device's performance (which corresponds to a slightly higher access time) and power consumption.

Either or both of the clock speed and supply voltage may then continually increment downward with each lower performance state level to correspond to incremental decreases in the performance and power consumption of the memory device 102. That is, the memory device 102 may be able to support multiple performance states each of which, e.g., moving downward in the hierarchy, correspond to some reduced level of clocking and/or supply voltage. Again, in various embodiments, in the case of performance states, the memory device 102 remains operable to read/write data from/to its internal memory array(s).

In an embodiment, each of the memory device's performance states operate out of the memory device's highest power state. All power states beneath the highest power state correspond to a non-operable state of the memory device where each lower power state corresponds to even less idle power consumption and a greater amount of time needed to bring the memory device from that power state to the highest (operable) power state.

For example, a first lower power state may turn off all clocks but have full supply voltage applied to the memory device. In this case, bringing the memory device back to the highest, operable power state only requires turning the clocks on.

By contrast, in a second even lower power state not only are the clocks turned off but the supply voltage is also lowered. The memory device 102 will consume less power in the second lower state (because the supply voltage is lowered) but will take longer to bring back to an operational state (because the clocks can be turned on only after the supply voltage has been raised). The memory device may also, e.g., support a lowest power state level in which the memory device has no active clock and receives no supply voltage. In this lowest state the memory device has no functionality and ideally consumes no power.

The power management controller 106 is responsible for controlling the memory device's transitions between performance states and power states. For example, in the case where the power state of the memory device 102 is to be lowered from a higher power state to a next lower power state, the power management controller 106 may remove a supply voltage from circuits that receive the supply voltage in the higher power state and/or lower an internal voltage supply rail node within the memory device 102.

A problem with prior art implementations in which memory device 102 includes a power management controller 106 is the inefficiency and/or control associated with dropping the memory device 102 from a higher power state to a lower power state.

For example, according to one prior art approach, if the host side wants to transition the memory device 102 from a first lower power state to a second lower power state, the memory device 102 first needs to be woken up from the first lower power state and brought back to the highest power state so that it can receive and process the command to drop it to the second lower power state. Waking the memory device 102 just to put it deeper into sleep is an inefficient and time consuming process.

Another prior art solution does not wake the memory device 102 but instead relies on the power management controller 106 to autonomously drop the memory device from the higher power state to the lower power state in a mode where the power management controller 106 is communicatively isolated from the memory controller 101. Here, once the Power Management Controller 206 proceeds with dropping the memory device 102 to a lower power state, the power management controller 106 is essentially unable to communicate any further with the memory device 102 until it completes the power state transition to the lower level. As such, the memory controller 101 loses direct control over the memory device 102 and the memory device's exit latency (time consumed transitioning to a state other than the lower power state) and responsiveness.

Figure 2:
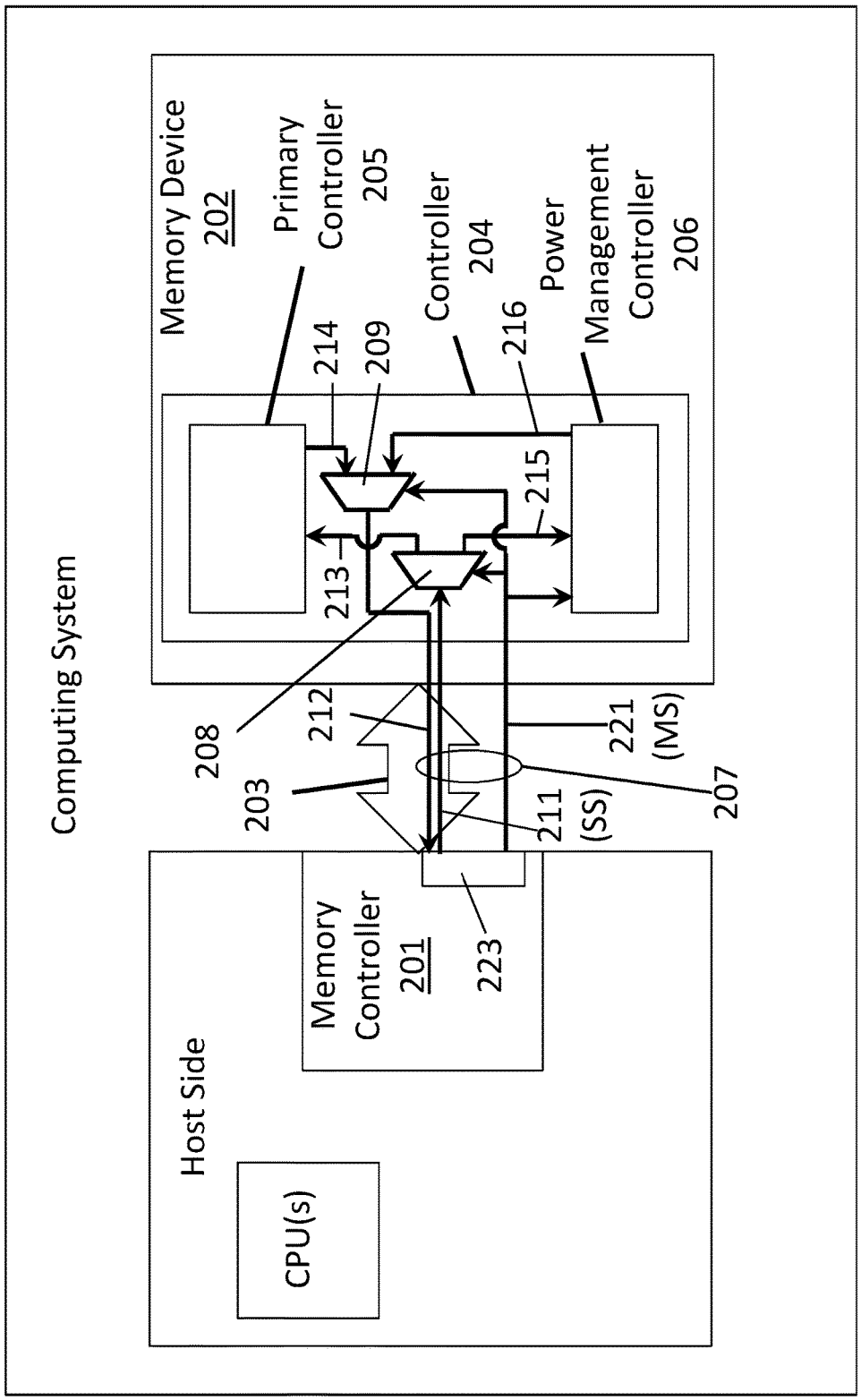
FIG. 2 shows a memory bus having a sideband channel.

FIG. 2 shows an improved approach in which the memory bus 203 has been enhanced to include a side channel 207 that provides the host side with more extensive control over the memory device's power management controller 206 than is possible with the aforementioned prior art solutions. Here, the memory device 202 is understood to be a singular semiconductor memory chip or an integration of multiple semiconductor memory chips such as a dual in-line memory module (DIMM) card, multiple DIMMs plugged into one or more memory channels, multiple stacked memory chips within a same semiconductor chip package, etc.

The one or more memory chips may be volatile memory (e.g., dynamic random access memory (DRAM)) or non volatile memory (e.g., FLASH). In the case of non volatile memory, the non volatile memory may be an emerging non volatile memory such as, to name a few possibilities, a phase change based memory, a three dimensional crosspoint memory, "write-in-place" non volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc. Any of these technologies may be byte addressable so as to be implemented as a main/system memory in a computing system.

Emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

In the case where the memory devices include non volatile memory technology, in various embodiments, the non volatile memory devices act as a true system memory in that they support finer grained data accesses (e.g., cache lines) rather than only larger based "block" or "sector" accesses associated with traditional, non volatile mass storage (e.g., solid state drive (SSD), hard disk drive (HDD)), and/or, otherwise act as an (e.g., byte) addressable memory that the program code being executed by processor(s) of the CPU operate out of. Here, the non-volatile memory devices may be part of a multi-level system memory having, e.g., DRAM devices at a first (faster) level and non volatile memory at a second (slower) level. The DRAM and non volatile memory devices could be in a same package that are controlled by controller 204 of FIG. 2. In combined or other implementations the non volatile memory devices may act as traditional mass storage.

In the particular embodiment of FIG. 2, the controller 204 of the memory device includes a de-multiplexer 208 and a multiplexer 209 that are used to switch first and second signal lines 211, 212 of the memory bus 203 between a normal mode/use and a sideband mode/use. Also, one additional signal line 221 is used to not only send a power management control signal to the power management controller 206 but is also used to provide a channel select control signal to both the de-multiplexer 208 and the multiplexer 209.

In an embodiment, when the memory device 202 is operating normally (e.g., in the highest power state and in any one of multiple performance states), a control signal on external signal line 221 is not asserted which: 1) informs the power management controller 206 that the memory controller 201 is not currently exercising power management control over the memory device 202; and, 2) causes the de-multiplexer 208 and the multiplexer 209 to effect normal usage of signal lines 211, 212 rather than a power management mode use (the latter of which is described in more detail below).

Thus, when signal line 221 is not asserted, the power management controller 206 understands that it is not receiving a direct power management control signal from the memory controller 201. Additionally, signal lines 211, 212 are being used for their nominal purpose as part of memory bus 203.

In the embodiment of FIG. 2, signal lines 211, 212 are nominally part of the command bus or control signal portion of memory bus 203. As such, by way of the un-asserted signal on signal line 221 and its effect on de-multiplexer 208, signal line 211 is routed into the primary controller 205 (along channel 213). With signal line 211 line nominally part of the command bus portion of memory bus 203, signal line 211 is nominally used when signal 221 is de-asserted to transport commands (or portions of commands) from the memory controller to the primary controller 205.

Similarly, also by way of the un-asserted signal on signal line 221 and its effect on multiplexer 209, signal line 212 carries control related messages (such as acknowledgements, alarms, etc.) sent from the primary controller 205 (along channel 214) to the memory controller 201. Here, again, with signal line 212 being nominally used as part of the command portion of the memory bus 203, signal line 212 is used to transport control related signals from the primary controller 205 to the memory controller 201.

Note that the nominal use of signal lines 211, 212 as part of the control bus of memory bus 203 is only exemplary. Conceivably, signal line 211 and/or signal line 212 could be part of other parts of memory bus 203 such as an address bus portion or a data bus portion. However, because signal lines 211, 212 are also used (as described immediately below) to implement a power management control sideband channel 207, their dual use for control information at least couples them to memory control circuitry 223 within the memory controller 201.

Note that other signal lines of the memory bus 203 may be used to implement the command bus portion and are also routed to the primary controller 205 directly. However because such other signal lines are not used to implement the power management control sideband channel 207 there are not depicted in FIG. 2. Note also that in alternative embodiments conceivably signal lines 211 and 212 could be merged into a single bi-directional line that can carry signals in both directions (from the memory controller 201 to the memory device 203, and, from the memory device 203 to the memory controller 201).

Further still, the formation of the power management control sideband channel 207 from signal lines 211, 212 that are nominally part of memory bus 203 and one additional signal line 221 that is not nominally part of the memory bus 203 is also only exemplary. Conceivably, one or both of signal lines 211 and 212 could be additional lines that are not nominally part of memory bus and therefore would not have a dual use. In this case, either or both of demultiplexer 208 and multiplexer 209 would not be needed as line 211 would flow directly into power management controller 206 and/or line 212 would flow directly from power management controller 206.

Alternatively or in combination, extra signal line 221 could be a signal line that is nominally part of memory bus 203 (such as an unused reserved signal line in a dual data rate (DDR) compliant memory bus) rather than being external to nominal memory bus 203. Here, in various embodiments, a signal line that is nominally part of memory bus 203 may be specified in an industry standard specification (such as a DDR industry standard specification) that the bus 203 conforms to whereas a signal line that is not nominally part of memory bus 203 is not specified in the industry standard. Alternatively, various embodiments described herein contemplate all signal lines 211, 212, 221 being part of an industry standard specification that the memory bus 203 conforms to. In such embodiments, signal lines 211, 212 may have dual use between a nominal operating mode and a special power management mode (described below) while signal line 221 does not have a dual use and is only used for the special power management mode. In still other embodiments, the memory bus 203 may be a proprietary bus. Memory bus 203 may be a true multi-drop bus that is connected to multiple memory devices of which memory device 202 is just one. Alternatively, memory bus 203 may be a multi-wire point to point link between the memory controller 201 and the memory device 202.

As discussed at length above, signal lines 211, 212 are used for their nominal purpose when signal line 221 is not asserted. However, when signal line 221 is asserted, the power management controller 206 within the memory device understands that the sideband channel 207 has been established between itself and the memory controller 201 for the purpose of exchanging power management related communications with the memory controller 201. Additionally, the channel select of demultiplexer 208 is set to route signal line 211 to the power management controller 206 along channel 215 and the channel select of multiplexer 209 is set to route signal line 212 from the power management controller 206 along channel 216.

Figure 3:
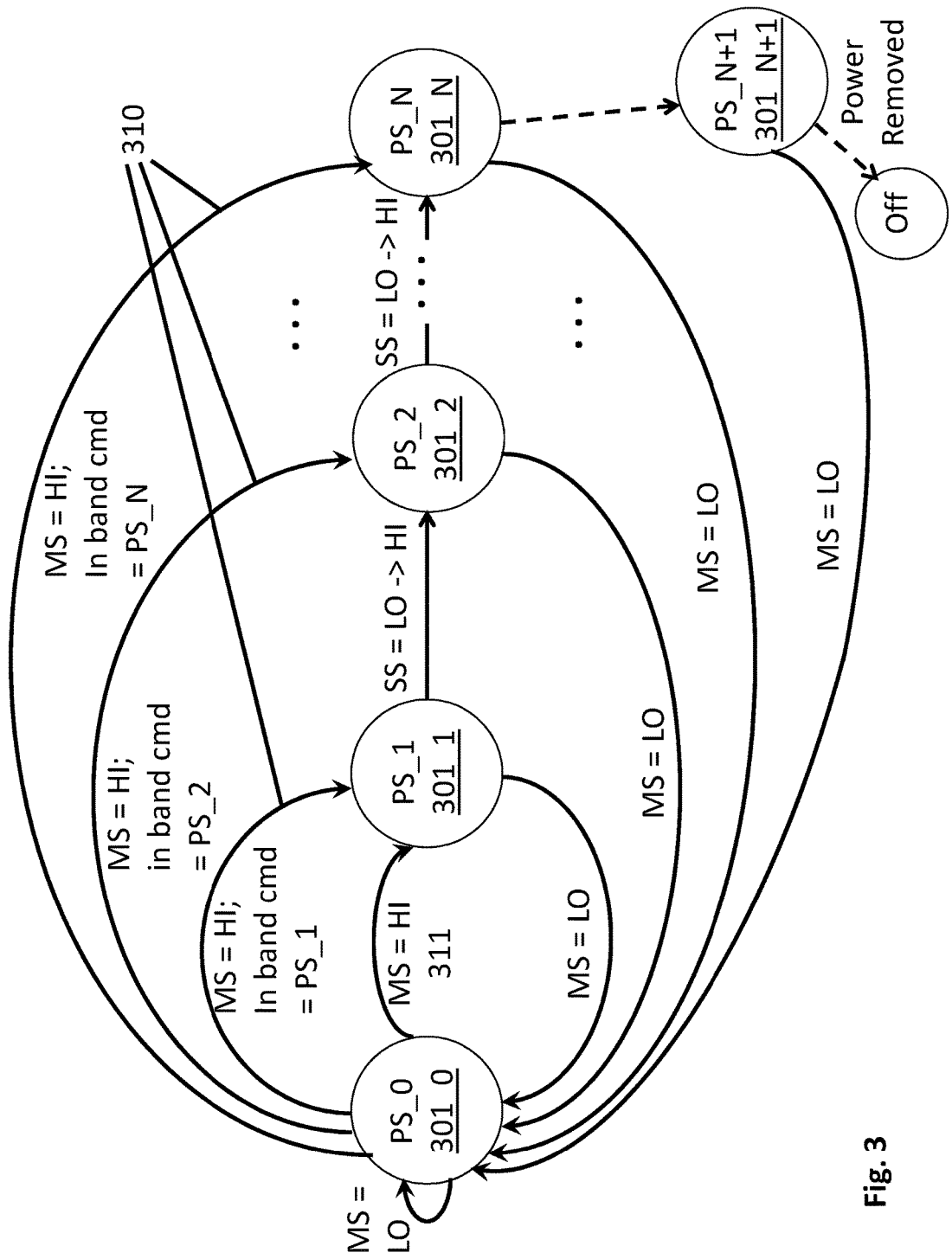
FIG. 3 shows a state diagram for a power management control protocol of a memory device.

FIG. 3 shows a state diagram for an embodiment of a communication protocol that is established between the host-side memory controller 201 and the power management controller 206 over the side band communication channel 207. For convenience, the signal on signal line 221 is labeled as the main signal (MS) and the signal on signal line 211 is labeled as the secondary signal (SS).

In the state diagram of FIG. 3, base power state PS0 301_0 corresponds to the highest power state of the memory device. As discussed above, when the memory device is in the highest power state PS0, the memory device 203 is operational for nominal read/write activity and the SS signal line 211 is being used for its nominal purpose (e.g., as part of the command bus portion of the memory bus 203). As observed in FIG. 3, and as discussed at length just above, in base state 301_1 the main signal MS on signal line 221 is de-asserted.

However, when the MS signal on signal line 221 is asserted by the host, as observed in FIG. 3, the power management controller 206 can be instructed to enter any one of the multiple lower power states PS_1 301_2 to PS_N 301_N of the memory device. Furthermore, the manner in which the power management controller 206 can be instructed to enter any of low power states PS_1 301_2 to PS_N, 301_N, in various embodiments, can be either of two different ways.

According to a first approach, if a command to enter any specific one of the low power states is received in-band (e.g., by way of the nominal approach for sending commands over bus 203) coupled with, e.g., before, assertion of the MS signal, the device can transition directly from PS_0 to any of the power states PS_1 through PS_N. Here, the in-band command specifies which particular one of the lower power states is to be entered directly. In FIG. 3, these power state transitions are represented by high arcs 310.

According to a second approach, if no command to enter a specific low power state is coupled with assertion of the MS signal, when the MS signal is asserted by itself, the memory device will drop into its first lower power state PS_1 301_2. This transition is labeled in the state diagram as transition 311. If the memory device is then to be entered into any of the 2nd through Nth lower power states PS_2 301_3 through PS_N 301_N, which specific one of these power states that is ultimately to be entered is communicated from the memory controller 202 to the power management controller 206 through the secondary signal SS on signal line 211.

Specifically, each LO to HI transition of the SS signal that is received along channel 215 while MS remains HI and after the memory device has acknowledged entry into its present lower power state, is interpreted by the power management controller 206 to mean entry into a next lowest power state. For example, FIG. 4a shows a signal sequence that will cause the power management controller to enter the first lower power state PS_1 301_2. By contrast, FIG. 4b shows a signal sequence that will cause the power management controller to enter a third lowest power state PS3 (not shown in FIG. 3) and FIG. 4c shows a signal sequence that will cause the power management controller to enter a fourth lowest power state PS4 (also not shown in FIG. 3).

Referring to FIGS. 3 and 4a, the initial assertion 311 of the MS signal on line 221 causes the memory device to enter the PS_1 state from the PS_0 state. In various embodiments, this specific transition causes the memory device to leave an operational state and enter its first, shallowest sleep state. Subsequent to the assertion 311 of the MS signal and the acknowledgment by the memory device of its entry into the PS_1 state, the SS signal on signal line 211 is transitioned from LO to HI to acknowledge the device's entry into the PS_1 state and then transitioned from LO to HI again which causes the memory device to begin entry into the PS_2 state.

By contrast, as observed in FIG. 4b, after the memory device acknowledges entry into the PS_2 state and with MS remaining HI, the SS signal 211 is again transitioned from LO to HI which drops the memory device into the PS_3 state. Likewise, as observed in FIG. 4c, after the memory device acknowledges entry into the PS_3 state and with MS remaining HI, SS signal 211 is again transitioned from LO to HI which drops the memory device into the PS_4 state. Thus, in each of FIGS. 4a through 4c there is one LO to HI transition of the SS signal after an acknowledgement by the memory device of its entry into a prior power state with the total number of assertion edges corresponding to the precise power state level that the memory device is to be dropped into. The main signal MS on line 221 remains asserted throughout these signal transitions signifying that the sideband communication channel to/from the power management controller 206 is still enabled.

Note that, in the embodiments of FIGS. 4a through 4c, prior to any LO to HI transition of the SS signal, the memory controller 201 is not permitted to de-assert the SS signal on signal line 211 until it has received an acknowledgement from the power management controller 206 in response to the immediately prior LO to HI transition of the SS signal. As a consequence, race conditions between the SS and ACK controls and the actual power state transitions to lower power states will be substantially avoided.

In one embodiment, the memory device is not capable of transitioning down through power states out-of-order. That is, e.g., it cannot drop from the PS_0 state to the PS_2 state directly. Rather, it first transitions from the PS_0 state to the PS_1 state, then, drops from the PS_1 state to the PS_2 state. Here, accordingly, in one embodiment, the power management controller 206 asserts the ACK immediately after it has successfully entered a power state after which the memory controller 201 is permitted to de-assert the SS signal and initiate another LO to HI transition of the at SS signal to signify a drop down to a next lower level.

Note that the ability to sequentially drop the memory device down to a next lower level without waking the memory device up to the highest PS0 power state avoids the aforementioned problem in prior art solutions in which the memory device must be woken up to a highest power state simply to drop the device down to a lower power state.

Additionally, the state diagram of FIG. 3 shows that the device can be woken up to the highest power state PS0 by de-asserting the main signal MS on signal line 221. Here, the de-assertion of the main signal MS signifies that the special sideband channel 207 no longer exists. As such, in various embodiments, the power controller 206 immediately wakes the memory device 203 up to the highest power state PS0 which may include interrupting a power state transition to a lower power state that is currently in sequence.

The state diagram of FIG. 3 also shows an optional N+1th state in which supply voltage may be removed at least from the power management controller 206 and is therefore not capable of responding to any further commands sent over the side band channel 207. Here, if the N+1 state is reached, the memory device 203 may wake up to another one of the power states (e.g., power state PS_0) in response to the supply voltage being re-applied to the power management controller 206. If the device enters the N+1 state and power is uninterrupted, the de-assertion of MS will bring the device back to the PS_0 state.

Figure 5:
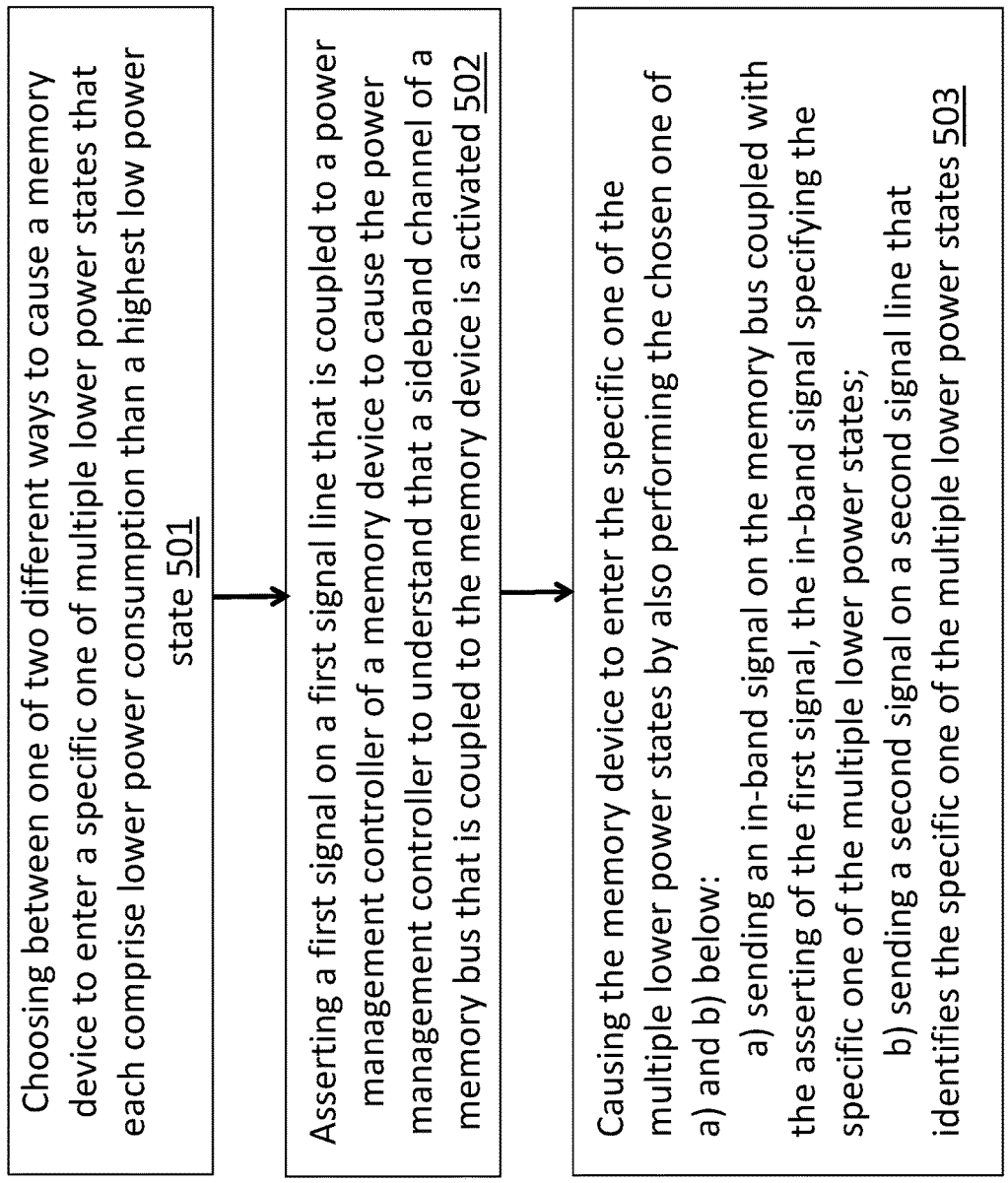
FIG. 5 shows a methodology for exercising power management control of a memory device.

FIG. 5 shows a methodology. The method of FIG. 5 includes choosing between one of two different ways to cause a memory device to enter a specific one of multiple lower power states that each comprise lower power consumption than a highest low power state 501. The method also includes asserting a first signal on a first signal line that is coupled to a power management controller of a memory device to cause the power management controller to understand that a sideband channel of a memory bus that is coupled to the memory device is activated 502. The method also includes causing the memory device to enter the specific one of the multiple lower power states by also performing the chosen one of: a) sending an in-band signal on the memory bus coupled with the asserting of the first signal, the in-band signal specifying the specific one of the multiple lower power states; b) sending a second signal on a second signal line that identifies the specific one of the multiple lower power states 503.

Figure 6:
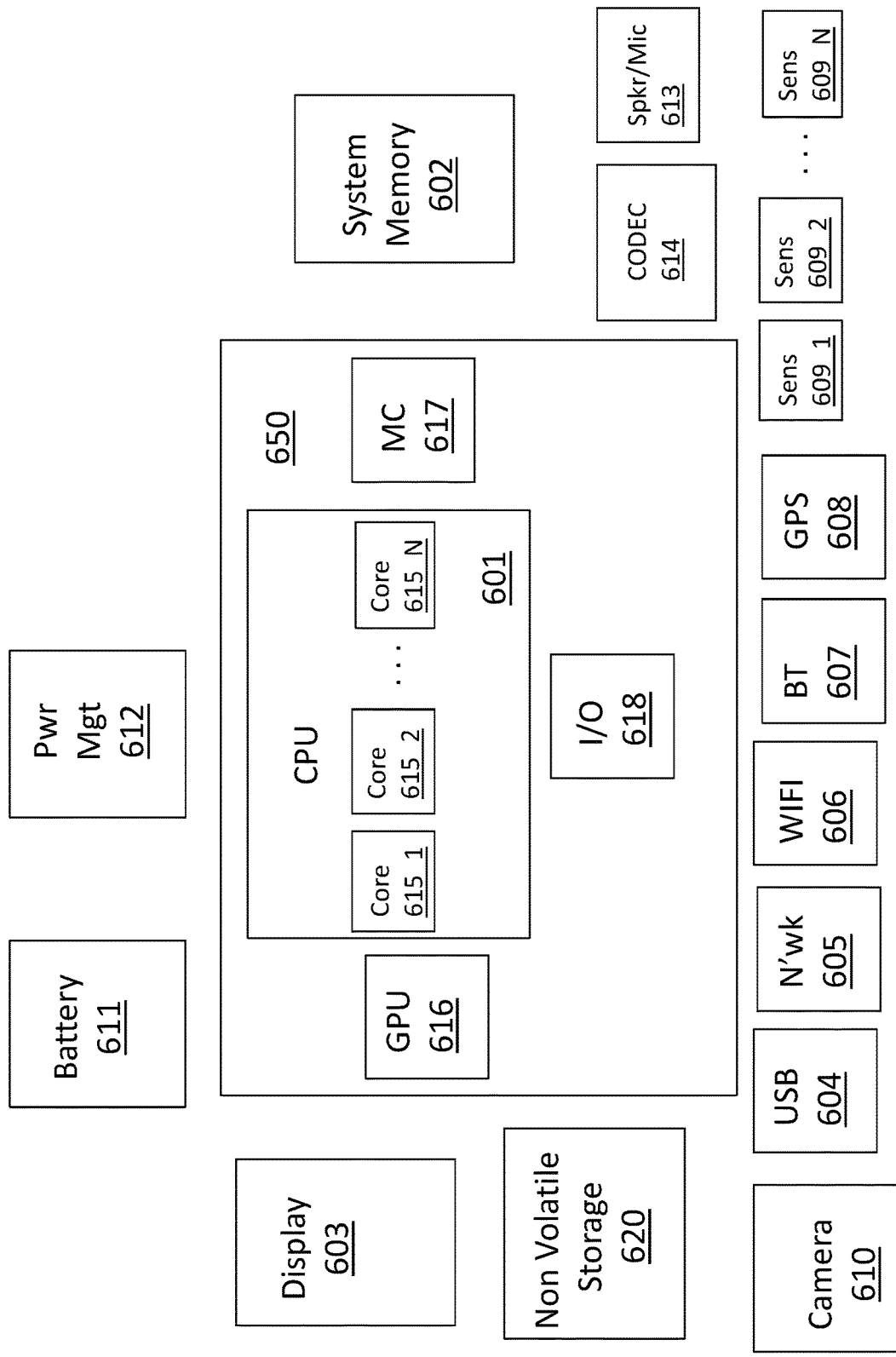
FIG. 6 shows a computing system.

FIG. 6 shows a depiction of an exemplary computing system 600 such as a personal computing system (e.g., desktop or laptop) or a mobile or handheld computing system such as a tablet device or smartphone, or, a larger computing system such as a server computing system. As observed in FIG. 6, the basic computing system may include a central processing unit 601 (which may include, e.g., a plurality of general purpose processing cores and a main memory controller disposed on an applications processor or multi-core processor), system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N (e.g., one or more of a gyroscope, an accelerometer, a magnetometer, a temperature sensor, a pressure sensor, a humidity sensor, etc.), a camera 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602. The memory controller 617 may be coupled to the system memory 602 via a memory bus having a sideband channel to communicate power control commands to power management controller within the system memory as described at length above.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the camera 610). Depending on implementation, various ones of these I/O components may be integrated on the applications processor/multi-core processor 650 or may be located off the die or outside the package of the applications processor/multi-core processor 650.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
choosing between one of two different ways to cause a memory device to enter a specific one of multiple lower power states that each comprise lower power consumption than a highest low power state;
asserting a first signal on a first signal line that is coupled to a power management controller of said memory device to indicate to said power management controller that a sideband channel of a memory bus that is coupled to the memory device is activated;
causing said memory device to enter the specific one of the multiple lower power states by also performing the chosen one of a) and b) below:
a) sending an in-band signal on said memory bus coupled with said asserting of said first signal, said in-band signal specifying the specific one of the multiple lower power states;
b) sending a second signal on a second signal line, wherein, the memory device is to drop down a number of immediately lower power states determined from a same number of pulses of the second signal on the second signal line, wherein said first signal line is coupled to a channel select input of a de-multiplexer that receives said second signal, said de-multiplexer causing said second signal to be channeled to said power management controller when said first signal is asserted and causing another signal received on said second signal line to be channeled elsewhere in said memory device when said first signal is de-asserted.

2. The method of claim 1 further comprising sending a third signal over said second signal line when said first signal line is not asserted, wherein said third signal is received by a component of said memory device other than said power management controller.

3. The method of claim 2 wherein said component of said memory device is a primary controller of said memory device.

4. The method of claim 1 further comprising receiving a respective acknowledgement from said memory device for each transition of said second signal when b) has been chosen.

5. The method of claim 1 wherein said asserting causes said memory device to drop from a highest power state to said highest low power state when b) is chosen.

6. The method of claim 1 further comprising de-asserting said first signal, said de-asserting causing said memory device to transition from the specific one of the lower power states to a higher power state in which said memory device is able to respond to memory read requests and memory write requests.

7. The method of claim 6 wherein said higher power state is a highest power state of said memory device.

8. An apparatus, comprising:
a memory controller comprising circuitry to control power consumption of a memory device, said circuitry to:
choose between one of two different ways to cause a memory device to enter a specific one of multiple lower power states that each comprise lower power consumption than a highest low power state;
assert a first signal on a first signal line that is coupled to a power management controller of said memory device to indicate to said power management controller that a sideband channel of a memory bus that is coupled to the memory device is activated;
cause said memory device to enter the specific one of the multiple lower power states by also performing the chosen one of a) and b) below:
a) send an in-band signal on said memory bus coupled with said assertion of said first signal, said in-band signal specifying the specific one of the multiple lower power states;
b) send a second signal on a second signal line, wherein, the memory device is to drop down a number of immediately lower power states determined from a same number of pulses of the second signal on the second signal line, wherein said first signal line is coupled to a channel select input of a de-multiplexer that is to receive said second signal, said de-multiplexer to cause said second signal to be channeled to said power management controller when said first signal is asserted and to cause another signal received on said second signal line to be channeled elsewhere in said memory device when said first signal is de-asserted.

9. The apparatus of claim 8 wherein said memory controller is to send a third signal over said second signal line when said first signal line is not asserted, wherein, said third signal is received by a component of said memory device other than said power management controller of said memory device.

10. The apparatus of claim 9 wherein said other component of said memory device is a primary controller of said memory device.

11. The apparatus of claim 8 wherein said circuitry comprises an input to receive a respective acknowledgement from said memory device for each transition of said second signal when b) has been chosen.

12. The apparatus of claim 8 wherein said assertion of said first signal causes said memory device to drop from a highest power state to said highest low power state when b) is chosen.

13. The apparatus of claim 8 wherein upon said circuitry de-asserting said first signal, said memory device transitions from the specific one of the lower power states to a higher power state in which said memory device is able to respond to memory read requests and memory write requests issued by said memory controller.

14. The apparatus of claim 13 wherein said higher power state is a highest power state of said memory device.

15. The apparatus of claim 8 wherein said memory controller is a component within a computing system comprising a network interface.

16. An apparatus, comprising:
a memory device comprising:
a power management controller having a first input to receive a first signal from a first signal line and a second input to receive a second signal from a second signal line, said first and second signal lines to be driven by a memory controller, wherein
an assertion of said first signal on said first signal line to indicate to said power management controller that a sideband channel of a memory bus that is coupled between the memory device and the memory controller is activated;
wherein said power management controller is able to enter a specific one of multiple lower power states according to an identified one of two different ways comprising:
a) reception of an in-band signal on said memory bus coupled with said assertion of said first signal, said in-band signal specifying the specific one of the multiple lower power states;
b) reception of a second signal on a second signal line, wherein, the memory device is to drop down a number of immediately lower power states determined from a same number of pulses of the second signal on the second signal line, wherein said first signal line is coupled to a channel select input of a de-multiplexer that is to receive said second signal, said de-multiplexer to cause said second signal to be channeled to said power management controller when said first signal is asserted and to cause another signal received on said second signal line to be channeled elsewhere in said memory device when said first signal is de-asserted.

17. The apparatus of claim 8 wherein said memory controller is to send a third signal over said second signal line when said first signal line is not asserted, wherein, said third signal is received by a component of said memory device other than said power management controller of said memory device.

18. The apparatus of claim 17 wherein said other component of said memory device is a primary controller of said memory device.

19. The apparatus of claim 16 wherein said power management controller comprises an output to send a respective acknowledgement from said memory device for each transition of said second signal when b) is the identified way.

20. The apparatus of claim 16 wherein said assertion of said first signal causes said memory device to drop from a highest power state to a highest low power state.

21. The apparatus of claim 16 wherein upon said memory controller de-asserting said first signal, said memory device transitions from the specific one of the lower power states to a higher power state in which said memory device is able to respond to memory read requests and memory write requests issued by said memory controller.

22. The apparatus of claim 21 wherein said higher power state is a highest power state of said memory device.

23. The apparatus of claim 16 wherein said memory device is a component within a computing system comprising a network interface.

* * * * *